No. 848,727. PATENTED APR. 2, 1907.
J. E. CRAWFORD.
HORSE PROTECTOR.
APPLICATION FILED JULY 10, 1906.
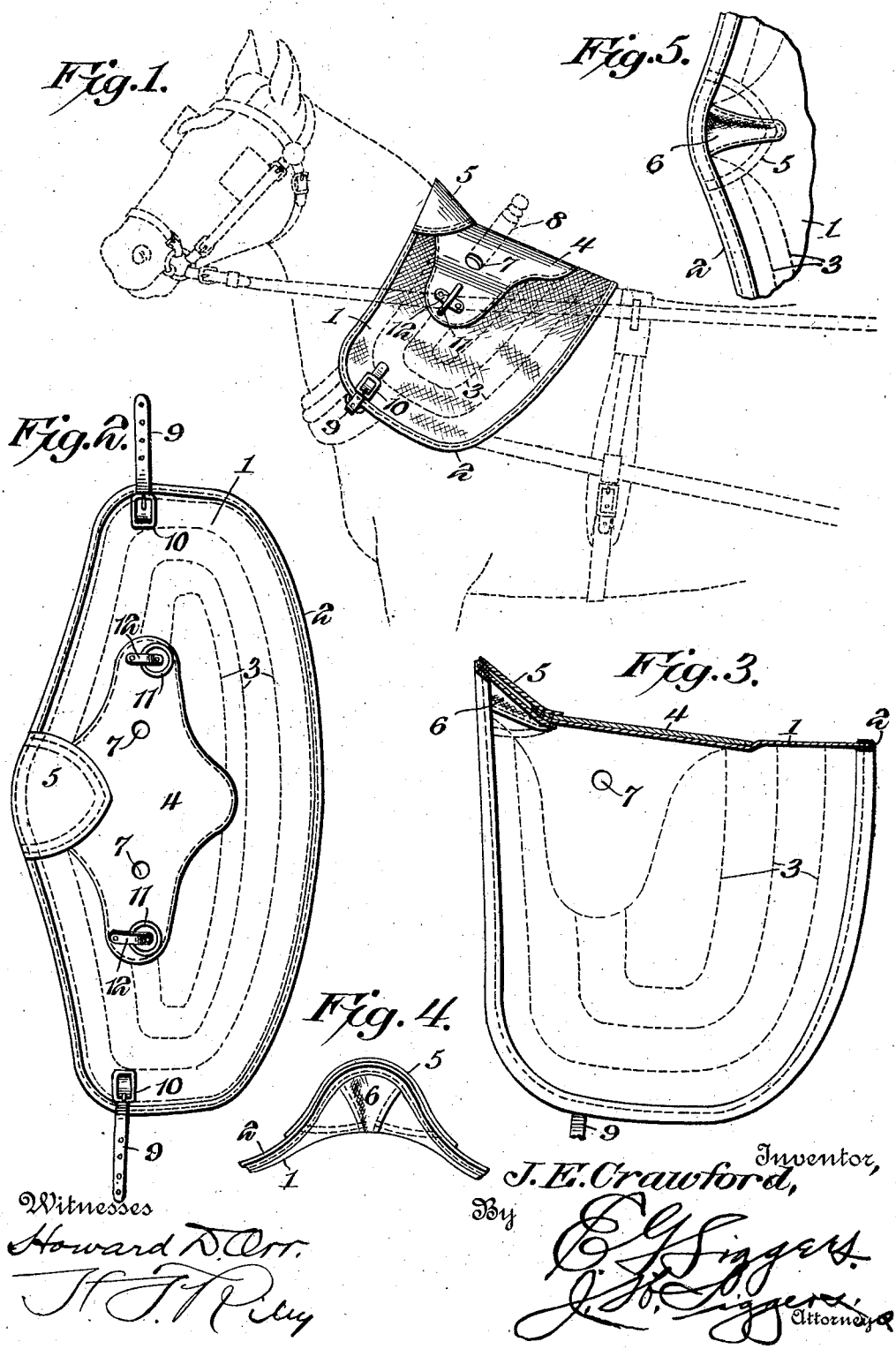
Witnesses
Howard D. Orr.
Inventor,
J. E. Crawford,
By
Attorneys

UNITED STATES PATENT OFFICE.

JAMES ERNEST CRAWFORD, OF CHARLESTON, WEST VIRGINIA.

HORSE-PROTECTOR.

No. 848,727.  Specification of Letters Patent.  Patented April 2, 1907.

Application filed July 10, 1906. Serial No. 325,531.

*To all whom it may concern:*

Be it known that I, JAMES ERNEST CRAWFORD, a citizen of the United States, residing at Charleston, in the county of Kanawha and State of West Virginia, have invented certain new and useful Improvements in Horse-Protectors, of which the following is a specification.

The invention relates to a shield for protecting draft-animals that use collars, hames, and other devices for pulling, held by pressure against the shoulders and the neck.

The object of the present invention is to provide a simple, inexpensive, and efficient shield adapted to be readily applied to a draft-animal to protect the neck and shoulders and prevent rain, sleet, dirt, snow, and the like from coming in contact with those portions of the neck and shoulders of a horse or other draft-animal subject to the pressure of harness, and thereby avoid the chafing and irritation caused by rain, snow, sleet, and the like getting between the harness and the draft-animal.

The invention also has for its object to provide a shield of this character adapted to absorb to a large extent the moisture or animal heat that may arise from the covered portion of a horse, so that such covered portion will be less sensitive to irritation.

A further object of the invention is to provide a horse-protecting shield which will be easy to handle and which may be readily attached to and removed from an animal.

Another object of the invention is to provide a shield which when an animal's head is raised may be readily adjusted to fit the neck properly and prevent undue pressure thereon.

With these and other objects in view the invention consists in the construction and novel combination of parts hereinafter fully described, illustrated in the accompanying drawings, and pointed out in the claims hereto appended, it being understood that various changes in the form, proportion, size, and minor details of construction within the scope of the claim may be resorted to without departing from the spirit or sacrificing any of the advantages of the invention.

In the drawings, Figure 1 is a side elevation of a shield constructed in accordance with this invention and shown applied to a horse. Fig. 2 is a plan view of the shield. Fig. 3 is a longitudinal sectional view of the same. Fig. 4 is a detail front elevation of the arched front portion of the shield. Fig. 5 is a reverse plan view of the same.

Like numerals of reference designate corresponding parts in all the figures of the drawings.

1 designates a horse-protecting shield designed to be constructed of one or more thicknesses of duck, canvas, or other light suitable fabric which is waterproof, or substantially waterproof. The shield, which is approximately elliptical in plan view, as illustrated in Fig. 2 of the drawings, is provided with a round edge 2, formed by a binding-strip of leather or other suitable material and adapted to prevent the edges of the shield from chafing or otherwise irritating an animal. The shield, which is curved longitudinally to enable it to fit around the neck and shoulders of an animal, is provided with spaced rows of stitches 3, arranged substantially parallel with the edge of the shield, and the latter is reinforced at the center by a piece 4, of leather or other suitable material, which imparts the desired form to the shield and preserves the shape of the same. The reinforcing-piece 4 is tapered toward the ends of the shield and is provided at its center with front and rear extensions. The edges of the reinforcing-pieces are stitched to the shield, and the front of the latter is provided with a central arched portion 5, formed by inserting a tapered piece 6 in the shield and covered and reinforced with leather. The arched portion is adapted to fit the neck of a horse or other animal, and it prevents the front edge of the shield from chafing or irritating the neck.

Suitable hame-holes 7 are provided at opposite sides of the center of the shield to enable the latter to be dropped over the hames 8, which projects through the hame-holes and retains the shield in position, as clearly illustrated in dotted lines on Fig. 1 of the drawings. These holes, however, may be omitted and will not be cut in the shield when the latter is employed on harness not provided with hames. When the holes are not used, suitable snap-hooks are provided at the inner face of the upper portion of the shield for connecting the same with the harness.

The lower edges or ends of the side portions of the shield are provided with short straps 9 and buckles 10 to enable the shield to be fastened to the lower portion of a horse-collar or other part of a harness arranged on and adapted to bear against the shoulders of a horse.

The shield may, if desired, be coated either interiorly or exteriorly, or both of its faces may be coated with a suitable preservative. It may be given a coat of waterproof paint, or it may be washed, boiled, or otherwise treated with linseed-oil, paraffin, or any other waterproof material. The shield is provided at opposite sides with rings 11, adapted to receive the driving-reins or lines of a harness and secured to the reinforcing-piece 4 at the ends thereof by means of short straps 12, as clearly shown in Fig. 2 of the drawings. The straps 12, which form loops and which pass through the rings 11, have their ends suitably secured to the said reinforcing-piece 4.

It will be seen that the horse-protecting shield is simple and comparatively inexpensive in construction and that it is light, strong, and durable and adapted to be readily applied to and removed from a horse. It will also be apparent that those portions of the neck and shoulders of a horse which are subjected to the pressure of the harness are protected by the shield, which excludes rain, snow, sleet, dirt, and the like from the said parts, and thereby prevents the chafing and irritation which are present when the neck and shoulders of a horse are exposed to the weather.

Having thus fully described my invention, what I claim as new, and desire to secure by Letters Patent, is—

A horse-protecting shield of substantially oblong shape adapted to be placed around and conform to the neck and shoulders of an animal and to extend downwardly from the base of the neck to and terminating at the bottom portion of the horse-collar at opposite sides thereof, said shield being constructed of flexible fabric and provided at its front edge with an arched neck-receiving portion, a reinforcing-piece of stouter material arranged at and extending from the opposite sides of the central portion of the shield to preserve the shape of the same, and terminal straps secured to the shield at the ends thereof and provided with means for securing them to the horse-collar or hames of a harness.

In testimony whereof I have affixed my signature in presence of two witnesses.

JAMES ERNEST CRAWFORD.

Witnesses:
W. L. ASHBY,
I. M. REILEY.